March 12, 1957  L. F. WORKING, JR  2,784,405
NAILING STRIP
Filed May 31, 1955  2 Sheets-Sheet 2
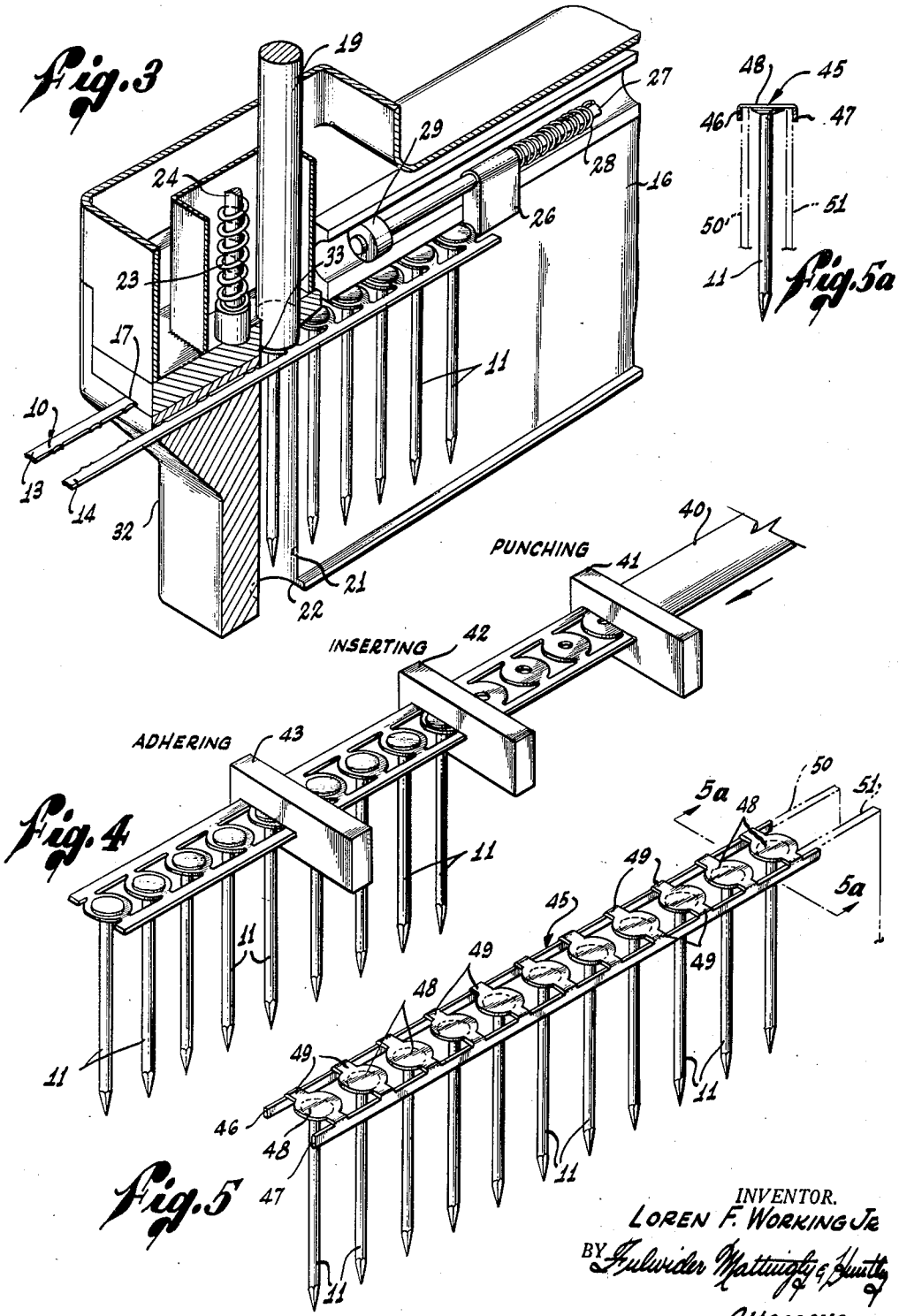
INVENTOR.
LOREN F. WORKING JR

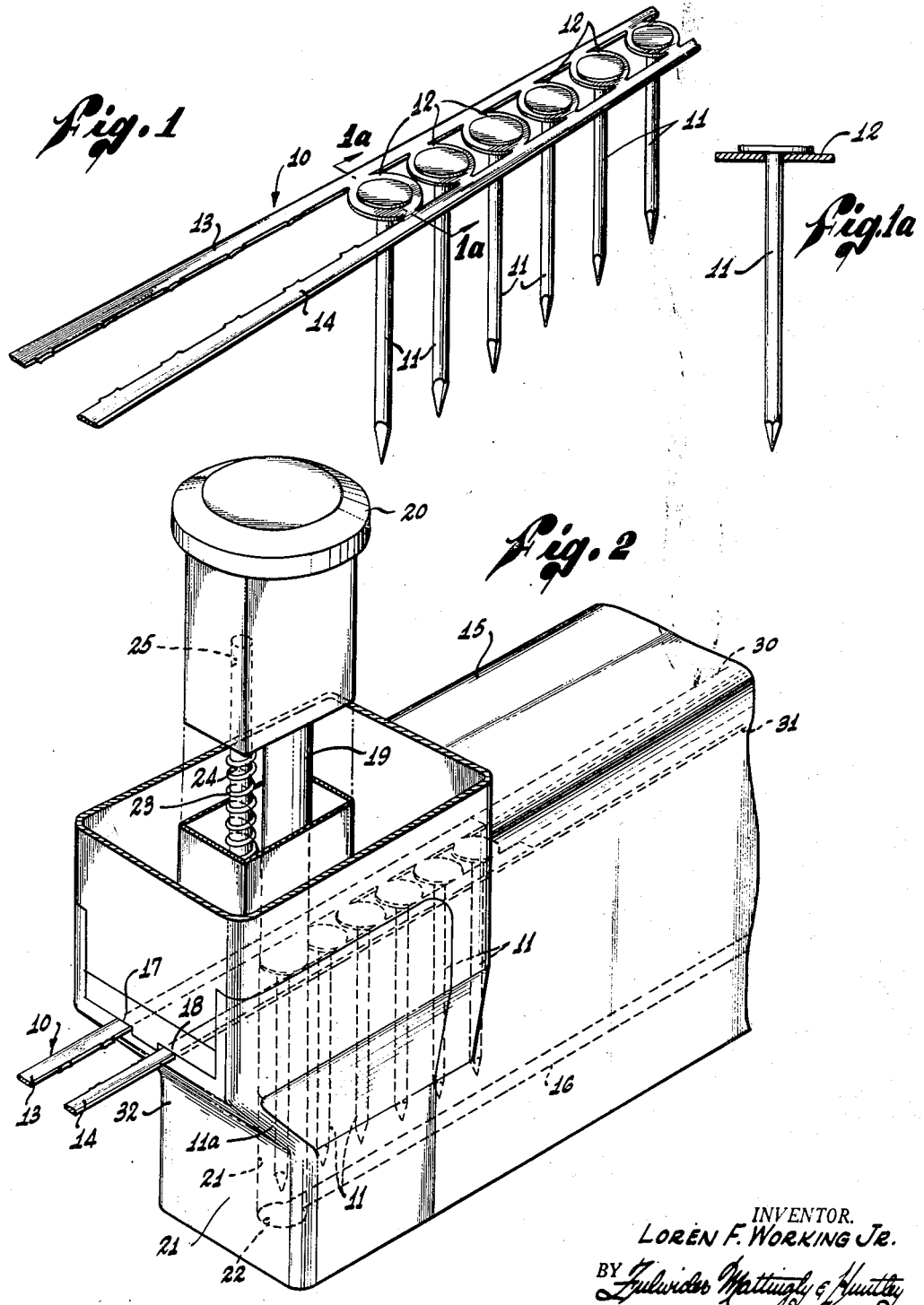

United States Patent Office 2,784,405
Patented Mar. 12, 1957

2,784,405

NAILING STRIP

Loren F. Working, Jr., Canoga Park, Calif., assignor to Fas'nail, Inc., a corporation of California Application May 31, 1955, Serial No. 512,130

6 Claims. (Cl. 1—24.5)

This invention relates to nail driving machines, and particularly to a means for feeding a series of nails to driving position by means of a nail carrying strip which is intermittently advanced to precise registration under a hammer. The invention claimed herein relates to the continuous strip carrying the nails and is not confined to any particular type of nail driving machine, whether manual or power operated. However, the invention is particularly suited for use with a power operated automatic nailing machine, driven by compressed air, or by electrical, gasoline engine, or explosion means.

In the past, continuous strips of nails have been made by attaching a row of nails to a strip of cloth, leather, or metal, or by manufacturing the nails themselves in a single integral piece from which nails could be successively sheared. However, previous continuous strips were not suitable for use in the type of nailing machines described, particularly those in which the power supplied is sufficient to drive the nail its full length into the work with a single blow of the hammer. In such automatic nailing machines it is obsolutely necessary that the nail be in perfect alignment with the hammer and approximately normal to the work surface since it is not practical to make provision for straightening a misdirected nail by shifting the direction of successive hammer blows. It is not practical to rely upon the configuration or shape of the nail itself for delivering the nail precisely to proper hammering position. Nails vary considerably from one to another, even though of the same size; there are slight variations in thickness of head and shank, and varying amounts of flashing where the nail forming dies come together. Another problem encountered in connection with automatic nailing machines is that of conserving the kinetic energy of the hammer for driving the nail while dissipating only a minimum amount of kinetic energy in shearing the nail from the continuous strip carrying it.

It is a major object to provide a continuous strip of nails which presents accurately formed surfaces for engagement with feeding, driving, and registration means in automatic nailing machines, regardless of imperfections and variations in the nail.

Another object is to provide a continuous nailing strip of sufficient rigidity and strength to retain accurate configuration required for a rapid and precise nailing machine operation, while at the same time permitting shearing of the nail from the strip with a minimum dissipation of the kinetic driving energy of the hammer.

The drawings show two species of continuous nail strips and the mode of employment of a continuous nail strip within the scope of this invention in an automatic nailing machine, sufficient parts of the latter being shown to demonstrate the method of the invention.

Figure 1 is a perspective view of one form of continuous nail strip, as it appears after some of the nails have been sheared from it by driving action of the hammer;

Figure 1a shows a vertical sectional view through the strip of Figure 1;

Figure 2 is a perspective view, partly in section, of the pertinent parts of one type of automatic nailing machine suitable for employing a continuous strip nailing method herein disclosed;

Figure 3 is another perspective view of the nailing machine of Figure 2, this time in longitudinal vertical section with some parts removed to reveal the strip as it passes under the hammer;

Figure 4 is a diagrammatic representation of the steps in manufacturing a continuous nail strip of Figure 1;

Figure 5 is another embodiment of continuous nail strip invention;

Figure 5a is a vertical sectional view through the continuous nail strip of Figure 5 taken in the direction indicated by the arrow 5a in Figure 5.

In Figure 1 a partially used nail strip indicated generally by the numeral 10 is shown supporting a row of nails 11 with their shanks parallel and their heads in substantially the same plane. Strip 10 is thin enough to be readily shearable, long enough to accommodate a substantial number of nails, and somewhat wider than nail head diameter. Between nails, parts of the metal strip have been punched out to form a row of nail supporting discs 12 between longitudinal side rails or guides 13 and 14. Each of discs 12 has a hole punched in its center for the insertion of a nail as seen in the sectional view of Figure 1a. The discs 12 are not contiguous to one another but are joined at their side edges to guide rails 13 and 14.

Figure 2 shows nail strip 10 in use. Nailing machine 15 is shown only in those details necessary to illustrate use of nail strip 10, which is seen in dashed line within the magazine chamber 16. As seen in Figure 2, nail strip 10 is half used and the guide rails 13 and 14 project from the discharge openings 17 and 18 in the front of nailing machine 15. Hammer 19 is a cylindrical bar having a cross section of about the same diameter as disc 12, and is surmounted by a driving head 20 which may be driven by a heavy mallet or suitable power operated means (not shown).

When the driving head 20 is struck, hammer 19 cleanly shears disc 12 from side rails 13 and 14 and drives the nail 11a in driving position down hammer bore 21 and into the work under the opening 22 at the lower end of the hammer bore. The hammer blow compresses a spiral spring 23, which is wound around a guide rod 24, guide rod 24 being received into a vertical cylindrical bore 25 provided in driving head 20 for this purpose.

In the sectional view of Figure 3, from which driving head 20 has ben eliminated to provide a simplified view, it is seen that nail strip 10 is urged resiliently through magazine chamber 16, which is here exposed, by a feed plunger 26 riding on a feed rod 27 and urged thereon by the spiral spring 28 toward feed stop 29 at the end of the feed rod. Side rails 13 and 14 support the nail strip 10 as it slides along horizontal longitudinal guide slots 30 and 31 seen in dashed line in Figure 2. Hammer bore 21 passes through a relatively massive anvil portion 32 of nailing machine 15, and co-operates with hammer 19 in the same manner as a hole-punching guide co-operates with a hole-punch so as to effect the shearing of disc 12 from nailing strip 10 as the hammer blow is struck.

After each nail is driven and hammer 19 has been returned to its upper position by spiral spring 23, nailing strip 10 is urged forward by feed plunger 26 until the forward edge from the succeeding disc 12 abuts against a registration surface 33, where the upper end of magazine cavity 16 is terminated by the forward wall of hammer bore 21. Guide slots 30 and 31 continue past driving position under hammer 19, becoming two separate passages through anvil portion 32, and terminating at openings 17 and 18 in the forward end of nailing machine 15.

A preferred sequence of steps in the manufacture of the nailing strip 10 illustrated in Figures 1 to 3 is represented in the diagram Fig. 4 in which metal strip 40 is seen moving continuously through the principal steps of manufacture, punching 41, insertion of nails 42, and adhering nails to the strip 43. It will be understood, of course, that the sequence shown might be supplemented by additional steps, such as galvanizing subsequent to adhering; or various steps might be combined, for example, adhering and inserting might be combined in a single operation in which nails are spot welded as inserted. Also, although I have shown nails being inserted through holes provided in metal strip 40, it will be understood that another form of nail strip could be manufactured by adhering the top of each nail to the undersurface of a disc.

Figures 5 and 5a illustrate another form of nail strip 50 in which side rail guides 46 and 47 are in longitudinal vertical plane normal to the plane of disc 48 and parallel to the shanks of nails 49. In the embodiment of Figures 5 and 5a, discs 48 are seen to be the center portion of relatively narrow cross bars 49. However, it will be understood that the nail strip 45 could be constructed with the discs 48 substantially tangential at their edges to guide rails 46 and 47. Nails 49 are adhered at their heads to the undersurfaces of discs 48, as shown in the vertical sectional view of Figure 5a, but the nail strip could alternatively be constructed by inserting the nails from above to holes provided in discs 48, after the manner of nail strip of Figure 1, if desired. Nail strip 45 is carried through a nailing machine on a pair of vertical side plates as indicated in dotted lines by numerals 50 and 51.

Adhering of the nails to the strip may be accomplished by spot welding, soldering, galvanizing in place, binding with resinous material, or any other well known means.

The strips should be stiff enough to provide precision feeding in the machine regardless of shocks and vibrations resulting from the machine-gun like operation of the hammer. However, the strip may, in some species, be sufficiently flexible to be wound on drums or even to be rotated through a quarter twist to permit edgewise winding.

Two preferred embodiments of the invention have been illustrated and described and several very different species also falling within the scope of the invention, conceived in its broadest and most generic sense, have been pointed out. However, it will be realized that these species are all capable of some modifications which fall within the scope of the general idea of the invention, or even within the scope of particular species. For this reason, the invention is not limited to the particular forms shown and described, but rather by the scope of the appended claims.

I claim:

1. A strip of nails for use in a nailing machine which includes: a nail carrying section extending longitudinally with respect to said strip and having throughout its length, at spaced intervals, areas for the attachment of nailheads, said areas being readily shearable from said strip; and at least one guide edge along said strip, said edge being formed in a plane intersecting the plane of said nail carrying section.

2. A strip of nails for use in a nailing machine, which includes: an elongated strip of thin, stiff, but shearable material; a row of nails supported by the nailheads from said strip; a registration surface on said strip corresponding to each nail and shaped to register against a registration surface in said nailing machine; and at least one guide edge along said strip, said edge being precisely formed to prevent lateral movement of said strip during feed advancement.

3. A strip of nails for use in a nailing machine which includes: an elongated ribbon of thin, stiff, but readily shearable material; a row of nails with shanks normal to the plane of said strip and supported by the nailheads from said strip, said nails being spaced to provide a gap between successive nailheads, and said strips having material removed between successive nailheads; an accurately formed registration surface between successive nailheads; and guide edges along each side of said strip, said edges being precisely forced to prevent lateral movement of said strips during feed advancement.

4. A strip of nails for use in a nailing machine which includes: an elongated ribbon of thin, stiff, but readily shearable material; a row of nails with shanks normal to the central portion of said strip and supported by the nailheads from said strip, said nails being spaced to provide a gap between successive nailheads, and said strips having material removed between successive nailheads; an accurately formed registration surface between successive nailheads; and guide edges along each side of said strip, said edges being disposed in a plane at an angle with said central portion.

5. A nail strip for use in a nailing machine which includes: a series of discs disposed in a row in the same plane but separated from each other, and having a diameter not substantially less than that of the nailheads, the frontal edges of said discs being shaped to register precisely with a registration surface on the interior of said nailing machine; edge guide means joining the lateral edges of said discs and adapted to precisely fit in said nailing machine and prevent lateral movement during feeding; and a row of nails disposed along said strip with their shanks normal to said discs and their heads adhered thereto, one to each disc.

6. A strip of nails for use in a nailing machine, which includes: an elongated strip of thin, stiff, but shearable material with a row of holes along said strip spaced longitudinally at least the width of one nail head apart; nails disposed along said strip in a row, each having its shank inserted through one of said holes therein; and registration means for each nail head location formed by removal of at least a portion of the material between successive nail heads.

References Cited in the file of this patent

UNITED STATES PATENTS 2,433,223   Johnson ---------------- Dec. 23, 1947